United States Patent [19]

Kluting et al.

[11] 4,121,802
[45] Oct. 24, 1978

[54] ADJUSTABLE SEAT WITH CONSTANT TORQUE

[75] Inventors: Bernd Klüting, Radevormwald; Hans Werner Voss, Wuppertal, both of Fed. Rep. of Germany

[73] Assignee: Keiper KG, Remscheid, Fed. Rep. of Germany

[21] Appl. No.: 801,738

[22] Filed: May 31, 1977

[30] Foreign Application Priority Data

Jun. 12, 1976 [DE] Fed. Rep. of Germany ....... 2626441

[51] Int. Cl.² .............................................. A47C 3/20
[52] U.S. Cl. ................................................. 248/421
[58] Field of Search ............... 248/421, 419, 396, 394, 248/395, 397, 393

[56] References Cited

U.S. PATENT DOCUMENTS 3,149,815 9/1964 Cotter ................................. 248/421
3,198,473 8/1965 Holz .................................. 248/421 X

FOREIGN PATENT DOCUMENTS 537,098 6/1941 United Kingdom ..................... 248/421
551,808 3/1943 United Kingdom ..................... 248/393
1,301,013 12/1972 United Kingdom ..................... 248/419

Primary Examiner—Francis K. Zugel
Attorney, Agent, or Firm—Michael J. Striker

[57] ABSTRACT

An adjustable automobile seat includes a pair of base members, a pair of carrier members for supporting a load, and support legs intermediate the base and the carrier members. An actuating handle is operative for vertically moving the carrier members relative to the base members to thereby adjust the height position of the seat. The support legs together with additional links form a four bar linkage intermediate the base and carrier members. The four bar linkage is operative for maintaining the torque for turning the actuating handle substantially constant during turning movement of the handle.

7 Claims, 4 Drawing Figures

ADJUSTABLE SEAT WITH CONSTANT TORQUE

BACKGROUND OF THE INVENTION

The present invention generally relates to load-lifting arrangements and, more particularly, to vertically adjustable car seats.

Car seats with vertical adjustment capability are known in the automobile industry. The seat portion is connected to a pair of carrier members which are in turn articulately connected to a pair of base members by support legs. An actuating handle is operative for moving the carrier members between lowered and raised positions relative to the base members.

It has been proposed to arrange a gear segment for concentric rotation about the pivot axis of the pivotable support legs provided at the rear of the seat. The pivotable support legs at the front of the seat, together with a hinge whose free end is connected to the seat portion of the seat, guide a pinion coaxially about the aforementioned pivot axis. The teeth of the pinion rotatably mesh with the teeth of the gear segment, thereby adjusting the position of the carrier members relative to the base members between a lowered and a raised position.

The known adjustable seat includes two pivotable support legs which are adjacent each other at the front of the seat, and another two pivotable support legs which are adjacent each other at the rear of the seat. All support legs are simultaneously pivotable along a vertical plane.

It is also known to mount the one or two pivotable front support legs for movement about a horizontal axis, and to mount the rear of the seat on guide rails which extend either horizontally or along curved or inclined paths.

The known adjustable car seats which are concentrically arranged gear segments and pinions are characterized in that the annular distance through which the support legs are moved corresponds to the angular distance through which the pinions and gear segments move. The known car seats have the disadvantage that the torque necessary for turning the actuating handle is relatively high when the carrier members are closest to the base members, that is when the carrier members are in their lowered position, and further that the torque is relatively low when the carrier members are furthest from the base members, that is when the carrier members are in their raised position. Therefore, when the actuating handle is turned, the magnitude of the turning torque is continuously varying, and the torque required at any particular time will depend upon the relative position between the carrier and base members. This changing torque characteristic is highly disadvantageous for a user.

SUMMARY OF THE INVENTION

Accordingly, it is the general object of the present invention to overcome the disadvantages of the prior art.

Another object of the present invention is to maintain the torque required for turning the actuating handle substantially constant during movement of the carrier members relative to the base members.

Yet another object of the present invention is to provide a long-lasting and maintenance-free load-lifting arrangement which is particularly well suited for adjusting the height position of automobile seats.

In keeping with these objects and others which will become apparent hereinafter, one feature of the invention resides, briefly stated, in an arrangement for lifting a load, and particularly an adjustable seat arrangement, which comprises a base member, and a carrier member adapted to support a load. The arrangement further includes actuating means including an actuator or handle turnable about a pivot point and operative for moving the carrier member relative to the base member between a lowered and a raised position.

In accordance with the invention, a four bar linkage is provided intermediate the base and carrier members. The linkage pivotally connects the carrier member to the base member and is operative for maintaining the torque for turning the actuator substantially constant during turning movement of the actuator about the pivot point.

In accordance with the invention, the torque required to turn the actuator handle is independent of the angle of inclination of the support legs which interconnect the base and carrier members or the relative position before the former and the latter.

The four bar linkage has a pole or center of rotation which is movable in a curved path as the carrier member is moved from its lowered towards its raised position. The pivot point about which the actuator is turned likewise moves in a curved path. The straight line distance defined by each instantaneous position of the pivot point and the respectively associated instantaneous position of the pole constantly increases during such movement of the carrier member. This is obtained by carefully selecting the length of the various links of the four bar linkage and the spacing intermediate the various pivot points of these links.

This increasing characteristic for the straight line distance compensates for the decreasing weight component which acts normally of this straight line distance. Thus, the substantially constant torque characteristic at all relative positions of base and carrier members results in easier handling by a user.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawings.

DESCRIPTION OF THE PREFERRED EMBODIMENT

Figure 3:
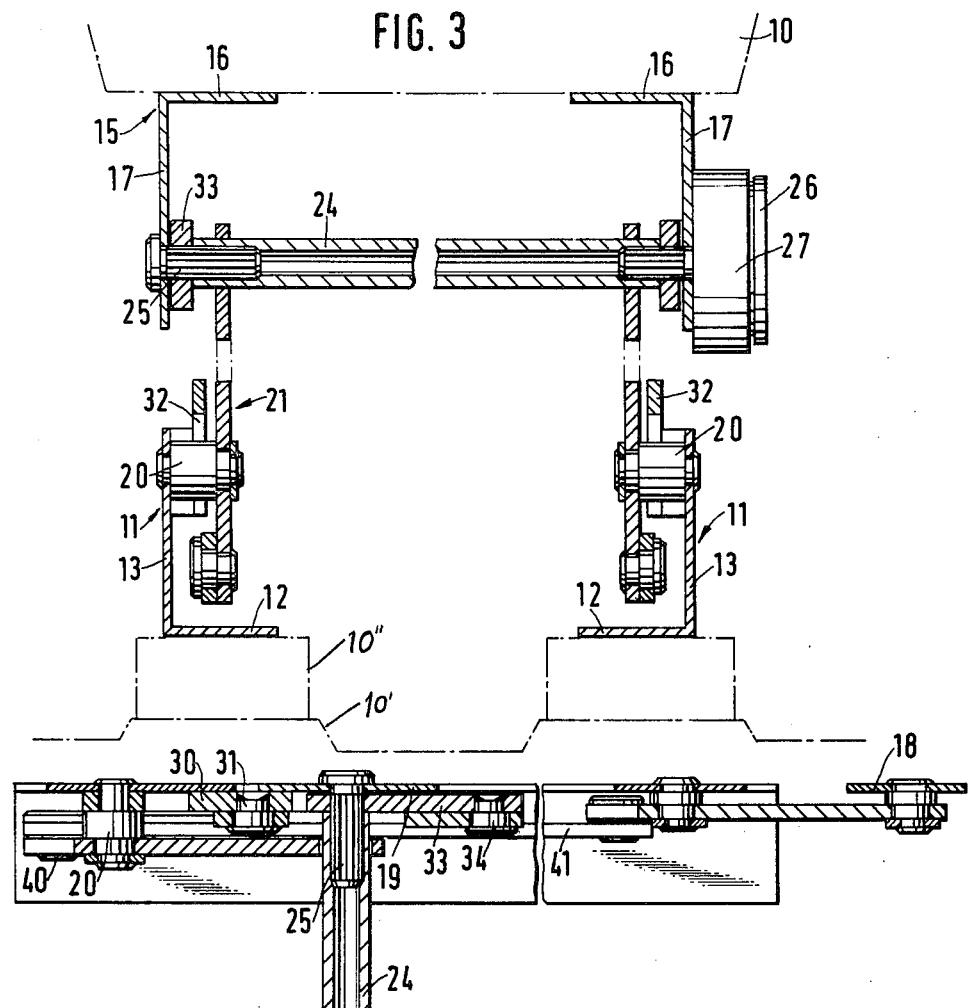
FIG. 3 is a partially schematic view in vertical section taken on line III—III of FIG. 2.
Figure 4:
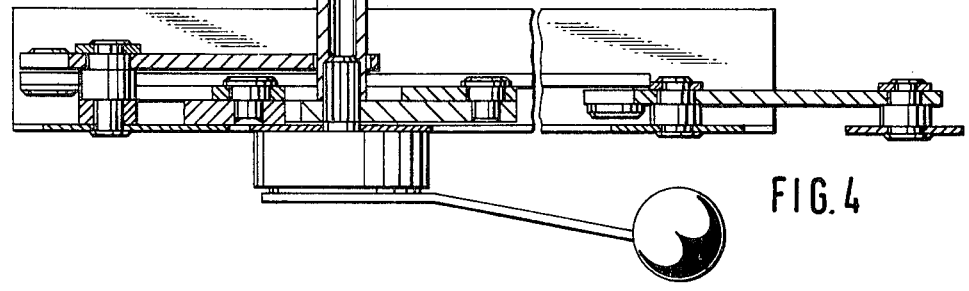
FIG. 4 is a partial view in horizontal section taken on line IV—IV of FIG. 1.

Reference numeral 10 in FIG. 3 schematically identifies a seat portion of a vertically adjustable seat for automobiles and the like. Reference numerals 10' and 10" respectively schematically identify the floor of a car and the guide rails upon which the seat is to be adjustably mounted for longitudinal movement along the guide rails 10". The invention is described in the context of such automobile seats for exemplary purposes only. It is to be understood that any load may be lifted by the load lifting arrangement of the present invention.

The load lifting arrangement includes a pair of base members 11 arranged mirror symmetrically relative to each other (see FIG. 3) and respectively mounted on guide rails 10" at the base 10' of a car for a longitudinally slidable and arrestable movement relative thereto. Each base member 12 has an L-shaped cross section and includes a base leg 12 and an upright leg 13. Mounting flanges 14 are arranged at the front and at the rear of each base member 11, i.e., at the left and right in FIG. 1.

A pair of mirror-symmetrical load-supporting carrier members 15 is respectively arranged above the base members 11. Each carrier member 15 has an L-shaped cross-section which includes an upright leg 17 and a top leg 16 which supports the seat portion 10. Mounting flanges 18 and 19 are arranged at the front and the rear of each carrier member 15, respectively.

At each front flange 14, a four bar linkage pivotally mounts each carrier member 15 to a respective base member 11. Each linkage includes a first link or support bracket 21 which has a longer arm 22 and a shorter arm 23. One end of the longer arm 22 is pivotally mounted on the base member 11 at a pivot point 20, and the other end of the longer arm 22 is pivotally connected to a turnable tubular member 24 for free turning movement relative to the latter at a pivot point 25 (see FIG. 3).

Each linkage also includes a second link or auxiliary support bracket 32 which has one end portion pivotally mounted on the base member 11 at a pivot point 31 and which has another end portion pivotally mounted to an end part of a third connecting link 33 at a pivot point 34. The other end part of the connecting link 33 is fixedly mounted on turnable tubular member 24 for a turning movement with the latter.

The tubular member 24 is turned by an actuating handle 26 which is operatively connected to a pair of splined pins 25 which are tightly received in opposite ends of the hollow connecting tubular member 24. The handle 26 is turned from the fully lowered position of FIG. 1, i.e., when carrier member 15 is closest to base member 11, through a predetermined angular distance towards the fully raised position of FIG. 2, i.e., when carrier member 15 is farthest from base member 11.

A braking mechanism 27 is arranged intermediate the handle 26 and the tubular member 24. The mechanism 27 transmits turning movement of the handle 26 to the tubular member 24, and also prevents such a transmission or force when a predetermined angular distance has been exceeded. Such mechanisms are conventional and details thereof can be found by reference to the German Pat. No. 975,780.

Figure 1:
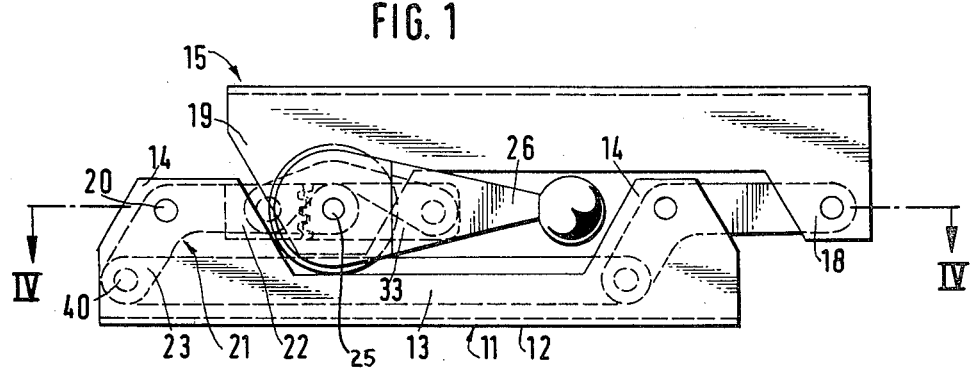
FIG. 1 is a side view of the load lifting arrangement in fully lowered position in accordance with the present invention.
Figure 2:
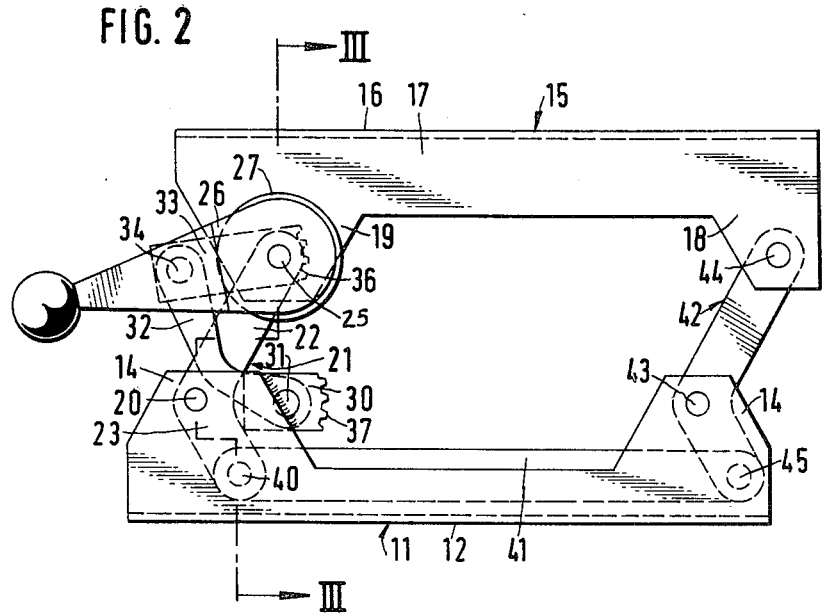
FIG. 2 is a side view of the FIG. 1 embodiment of the load lifting arrangement in a fully raised position in accordance with the present invention.

Each base member 11 has a stationary extension portion 30 fixedly mounted thereon, for example by welding. The extension portion 30 has a first set of gear teeth 37 which meshes with a second set of gear teeth 36 that are provided on the other end part of the connecting link 33. As shown in FIG. 1, the sets of teeth interengage each other when the carrier members 15 are in their fully lowered position. When the carrier members 15 are moved away from the base members 11, the sets of teeth 36 and 37 remain in interengagement for a short time until eventually the teeth 36 on the movable connecting link 33 move away from the teeth 37 on the stationary extension portion 30. This feature facilitates the initial movement of the carrier members 15 in direction away from the base members.

Each shorter arm 23 of a respective first link 21 is pivotally connected at a pivot point 40 to one end of a coupling rod 41. The other end of the coupling rod 41 is pivotally connected at pivot point 45 to a respective shorter arm of a rear support bracket 42. Each supporting bracket 42 is pivotally connected to a one base member 12 at a pivot point 43 at rear flange 14, and is also pivotally connected to a carrier member 15 at pivot point 44 at rear flange 18.

The length dimension of the longer arm 22 intermediate the pivot point 20 and the pivot point 25 is substantially the same as the distance between the pivot point 31 on the stationary extension 30 and the pivot point 34. Moreover, the spacing intermediate the pivot point 20 and the pivot point 31 on each base member 11 is substantially equal to the spacing between the pivot point 34 and the pivot point 25.

The arrangement in FIG. 1 is advantageously mounted at one longitudinal side of a seat. A similar arrangement without the actuating handle 26 and the braking mechanism 27 is mounted at the other longitudinal side of the seat.

In operation, as the handle 26 is turned from its illustrated position in FIG. 1, the pivot pins 25 and the tubular member 24 likewise turn together and impart such rotation to the connecting links 33 which are mounted for rotation with the tubular member 24. The first and second links 21, 32 likewise turn about their respective pivot points such that the four bar linkage has a pole which is movable in a curved path. The pivot point 25 is likewise movable in a curved path between first and second end limiting positions.

The two curved paths are spaced from each other such that the straight line distance defined by the position of the pivot point 25 at the first end limiting position relative to its respectively associated position of the pole is smaller in magnitude as compared to the straight line distance defined by the position of the pivot point 25 at the second end limiting position relative to its respectively associated position of the pole. Put another way: each successive straight line distance defined by an instantaneous position of the pivot point 25 with its respectively associated instantaneous position of the pole is larger than the preceding straight line distance.

Returning to FIG. 1, it will be noted that the weight of the load is resolved into a single force component which acts downwardly in direction tangentially of the curved path in which the pole of the linkage is moved. Now, referring to FIG. 2, it will be noted that the weight of the load may likewise be resolved but into two components, i.e., a tangential force component and a normal force component as considered with respect to the curved path of the pole of the linkage. Upon comparing both tangential components, the magnitude of the weight component in the raised position is less than the magnitude of the weight component in the lowered position of the carrier member.

It is now believed to be evident how the torque or moment of force necessary for turning the actuating handle 26 remains substantially constant during the movement of the carrier member. Torque is a function of the aforementioned instantaneous straight line distance and of the tangential weight component which is directed normally of this straight line distance. In accordance with the invention, the decrease in magnitude of the tangential weight component as the load is lifted upwardly is compensated by the increase in the straight line distance in an inversely proportional relationship. The above-described length and spacings of the various links of the four bar linkage cooperate with each other in a manner analogous to elliptically shaped gears to generate a constant torque characteristic for the handle 26. Modifications in any of the lengths or spacings will of course modify this torque characteristic of the handle 26.

It will be understood that each of the elements described above, or two or more together, may also find a useful application in other types of constructions differing from the types described above.

While the invention has been illustrated and described as embodied in an adjustable seat with constant torque, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for lifting loads, particularly an adjustable seat, comprising a base member; a carrier member adapted to support a load; means for mounting said carrier member on said base member for movement in a range between a lowered and a raised position, including at least one support member pivotally connected to said base and carrier members; and means for moving said carrier member through said range, including an acutator mounted on one of said members for turning about a pivot axis relative thereto and having an actuating portion, and a connecting link so pivotally connected to said actuator at a distance from said pivot axis and to another of said members that the force which is to be applied to said actuating portion to subject said actuator to a torque counteracting the torque with which said carrier member acts on said actuator remains substantially constant for a given load throughout said range.

2. An arrangement as defined in claim 1, wherein said one and said other members are said carrier and said base members.

3. An arrangement as defined in claim 2, wherein said connecting link has an effective length between the respective pivoting point thereof which substantially equals that of said support member.

4. An arrangement as defined in claim 2, wherein said support member and said connecting link are pivoted on said other member at a given spacing from each other which substantially corresponds to said distance.

5. An arrangement as defined in claim 2, wherein said support member and said connecting link are so arranged as to cross each other in space as said carrier member moves out of said lowered position.

6. An arrangement as defined in claim 1, wherein said actuator includes a handle having said actuating portion, and an arm connected to said handle for joint rotation therewith and pivoted to said connecting link.

7. An arrangement as defined in claim 2, wherein said base member has a stationary extension portion; and wherein said moving means further includes a set of teeth on said extension and a cooperating set of teeth on said actuator which meshes with said teeth of said extension portion during initial turning of said actuator to move said carrier member in the proximity of said lowered position thereof.

* * * * *